United States Patent
Kagan et al.

(10) Patent No.: US 11,663,064 B1
(45) Date of Patent: May 30, 2023

(54) SYSTEM AND METHOD FOR GENERATING A GUEST OPERATING SYSTEM CRASH DUMP

(71) Applicant: Virtuozzo International GmbH, Schaffhausen (CH)

(72) Inventors: Roman Kagan, Moscow (RU); Denis Lunev, Moscow (RU); Alexey Kobets, Seattle, WA (US); Victor Prutyanov, Moscow (RU)

(73) Assignee: Virtuozzo International GmbH, Schaffhausen (CH)

( * ) Notice: Subject to any disclaimer, the term of this patent is extended or adjusted under 35 U.S.C. 154(b) by 454 days.

(21) Appl. No.: 16/731,633

(22) Filed: Dec. 31, 2019

Related U.S. Application Data (60) Provisional application No. 62/894,928, filed on Sep. 2, 2019.

(51) Int. Cl.
  *G06F 11/07* (2006.01)
  *G06F 12/1009* (2016.01)
  *G06F 9/455* (2018.01)

(52) U.S. Cl.
  CPC ...... *G06F 11/0778* (2013.01); *G06F 9/45558* (2013.01); *G06F 11/0712* (2013.01);
  (Continued)

(58) Field of Classification Search
  CPC ............. G06F 11/0712; G06F 11/0778; G06F 2009/45591
  See application file for complete search history.

(56) References Cited

U.S. PATENT DOCUMENTS 6,681,348 B1 * 1/2004 Vachon ............... G06F 11/1415
  714/38.14
9,537,720 B1 * 1/2017 Baggott ................ H04L 41/065
(Continued)

FOREIGN PATENT DOCUMENTS

JP     2008242999 A  * 10/2008
WO  WO-2012137239 A1 * 10/2012  .......... G06F 11/0712

OTHER PUBLICATIONS

Wikipedia, "Processor register", 2018 (Year: 2018).*

*Primary Examiner* — Gabriel Chu
(74) *Attorney, Agent, or Firm* — ArentFox Schiff LLP; Michael Fainberg (57) ABSTRACT

Disclosed herein are systems and method for generating a guest Operating System (OS) crash dump. In one aspect, an exemplary method comprises, obtaining information about a guest physical memory and a state of a guest CPU, determining guest page tables including a data structure for mapping between the guest physical memory and guest virtual pages using registers of the guest CPU, identifying an interrupt handler and determining an address of the interrupt handler using the guest page tables and the registers of guest CPU, finding a location of a kernel image in memory by scanning virtual addresses backward starting from the interrupt handler until a beginning of an executable kernel module is found, identifying and fetching debug symbols, determining system task descriptors using the debug symbols, determining debugger relevant data using the debug symbols, and generating the crash dump header using the system task descriptors and the debugger relevant data.

20 Claims, 8 Drawing Sheets

(52) U.S. Cl.
CPC ...... *G06F 11/0751* (2013.01); *G06F 12/1009* (2013.01); *G06F 2009/45591* (2013.01); *G06F 2212/1032* (2013.01)

(56) References Cited

U.S. PATENT DOCUMENTS

| | | | | |
|---|---|---|---|---|
| 10,740,217 | B1* | 8/2020 | Stupachenko | G06F 9/45558 |
| 2005/0251806 | A1* | 11/2005 | Auslander | G06F 9/4881 |
| | | | | 718/100 |
| 2010/0083250 | A1* | 4/2010 | Nakai | G06F 11/079 |
| | | | | 718/1 |
| 2011/0173609 | A1* | 7/2011 | Buragohain | G06F 9/45558 |
| | | | | 718/1 |
| 2012/0179932 | A1* | 7/2012 | Armstrong | G06F 9/45558 |
| | | | | 714/E11.073 |
| 2014/0201348 | A1* | 7/2014 | Anantharam | H04L 41/022 |
| | | | | 709/223 |
| 2015/0100834 | A1* | 4/2015 | Chamberlain | G06F 11/0778 |
| | | | | 714/45 |
| 2020/0379675 | A1* | 12/2020 | Agarwal | G06F 3/0673 |
| 2020/0379792 | A1* | 12/2020 | Ashkar | G06F 9/445 |
| 2021/0117215 | A1* | 4/2021 | Wallis | G06F 12/109 |

* cited by examiner

SYSTEM AND METHOD FOR GENERATING A GUEST OPERATING SYSTEM CRASH DUMP

CROSS-CORRELATION TO RELATED APPLICATION

This application claims priority to and is related to provisional application No. 62,894,928 filed on Sep. 2, 2019, which is incorporated herein by reference.

TECHNICAL FIELD

The present disclosure is generally related to the field of analysis of conditions affecting guest operating systems, more specifically to systems and methods for generating a guest Operating System (OS) crash dump.

BACKGROUND

For conventional Microsoft Windows operating systems, the crash dump contains the whole memory state and additional information about some structures located in the memory. The crash dump can be efficiently analyzed by conventional Windows debuggers. For Microsoft Windows, upon each boot, needed structures are located in different places. Thus, there is no "prior knowledge" available for analysis.

In contrast, conventional hypervisors have access to the entire guest memory but have no information about the locations of needed structures. There are some approaches for identifying locations of guest kernel objects.

In a first approach, in case of critical error, the operating system (e.g., Microsoft Windows) may try to generate a crash dump on disk. But, the OS needs to be pre-configured to generate the crash dump and will not generate the crash dump without corresponding settings. In addition, in some cases, the problem (error) may be too serious and the OS may not be able to generate the crash dump. In other words, the problem may affect the OSs ability to generate the crash dump.

In a second approach, if the OS is a guest OS running inside a virtual machine (VM) under a hypervisor or a Virtual Machine Manager (VMM), then a special virtual device and its driver may be used to collect needed information. The hypervisor may generate the virtual device and add the generated virtual device to the VM. Then, during boot of the guest OS, the guest OS detects the generated virtual device, loads the corresponding driver of the generated virtual device, which collects all the necessary information (from which the crash dump can be generated) in the kernel, and passes the collected information to the hypervisor through the generated virtual device. Thus, the guest OS, during initialization of the device, passes the necessary data to the hypervisor. The data is not changed during operations of the guest OS. When/if a critical problem arises, the hypervisor has only to copy the memory. However, this approach does not work if a problem occurs at an early stage of loading (i.e., when the guest driver is not already loaded), or if there is no driver.

A third approach is to use a tool that collects only memory and then try to find locations of kernel objects needed to generate a crash dump header by scanning the whole memory. For example, some tools scan the whole memory and search for a "magic" field (e.g., like "KDBG"). Such an approach is not efficient and is not reliable, because of large amounts of memory that have to be scanned and a rather high probability of errors.

Thus, there is a need for an optimal tool to analyze problems with guest OSs running in a virtual machine environment, and to enable customers to report problems with crashes of guest OSs.

SUMMARY

Accordingly, a system and method is provided for generating a guest Operating System (OS) crash dump. In one aspect, the system comprises a computing device comprising a hardware processor configured to: obtain information about a guest physical memory and a state of a guest CPU, determine guest page tables including a data structure for mapping between the guest physical memory and guest virtual pages using registers of the guest CPU, identify an interrupt handler and determine an address of the interrupt handler using the guest page tables and the registers of guest CPU, find a location of a kernel image in memory by scanning virtual addresses backward starting from the interrupt handler until a beginning of an executable kernel module is found, identify and fetch debug symbols, determine system task descriptors using the debug symbols, determine debugger relevant data using the debug symbols, and generate the crash dump header using the system task descriptors and the debugger relevant data.

In one aspect, a method is implemented for generating a guest Operating System (OS) crash dumping a computer comprising a hardware processor, the method comprising: obtaining information about a guest physical memory and a state of a guest CPU, determining guest page tables including a data structure for mapping between the guest physical memory and guest virtual pages using registers of the guest CPU, identifying an interrupt handler and determining an address of the interrupt handler using the guest page tables and the registers of guest CPU, finding a location of a kernel image in memory by scanning virtual addresses backward starting from the interrupt handler until a beginning of an executable kernel module is found, identifying and fetching debug symbols, determining system task descriptors using the debug symbols, determining debugger relevant data using the debug symbols, and generating the crash dump header using the system task descriptors and the debugger relevant data.

In one aspect, the fetching of the debug symbols is performed by: determining a kernel version from a Portable Executable (PE) file header of the executable kernel module, and downloading the debug symbol for the kernel version.

In one aspect, the determination of the system task descriptors using the debug symbols comprises: parsing the debug symbols to determine offsets to data structures and respective fields, functions, variables and kernel objects to be used for preparing the crash dump in a format suitable for a debugger, and using the registers of the guest CPU to identify a current system task being executed on the guest CPU, a state of execution, and links to kernel objects needed for crash dump preparation.

In one aspect, the obtaining of information about the guest physical memory and the state of the guest CPU and generation of the crash dump is performed by a hypervisor.

In one aspect, the obtaining of information about the guest physical memory and the state of the guest CPU is performed by a hypervisor, and the generation of the crash dump is performed by a host or by a tool running on another device.

In one aspect, the determination of the guest page tables comprises extracting, from registers of the guest CPU, addresses or links to addresses of kernel objects.

In one aspect, the interrupt handler is identified using an Interrupt Descriptor Table (IDT), and wherein the IDT is extracted from the registers of the guest CPU.

In one aspect, the determination of the beginning of the executable kernel module of the OS comprises: searching until a Portable Executable (PE) file header is found, verifying a name of the image to determine whether the PE file header that is found is that of the executable kernel module, and continuing the search for a next PE file header, when the verification indicates that the PE file header that is found is not that of the executable kernel module.

In one aspect, the present disclosure describes a non-transitory computer readable medium storing thereon computer executable instructions for generating a guest Operating System (OS) crash dump, including instructions for: obtaining information about a guest physical memory and a state of a guest CPU, determining guest page tables including a data structure for mapping between the guest physical memory and guest virtual pages using registers of the guest CPU, identifying an interrupt handler and determining an address of the interrupt handler using the guest page tables and the registers of guest CPU, finding a location of a kernel image in memory by scanning virtual addresses backward starting from the interrupt handler until a beginning of an executable kernel module is found, identifying and fetching debug symbols, determining system task descriptors using the debug symbols, determining debugger relevant data using the debug symbols, and generating the crash dump header using the system task descriptors and the debugger relevant data.

The above summary of example aspects serves to provide an understanding of the teachings of the present disclosure. This summary is not an extensive overview of all contemplated aspects, and is intended to neither identify key or critical elements of all aspects nor delineate the scope of any or all aspects of the disclosure. Its sole purpose is to present one or more aspects in a concise form as a prelude to the more detailed description of the disclosure that follows. To the accomplishment of the foregoing, the one or more aspects of the methods and systems of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the teachings of the present disclosure and, together with the detailed description, serve to explain their principles and implementations.

DETAILED DESCRIPTION

Various exemplary aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects. The following presents a description of one or more exemplary aspects in order to provide a basic understanding of the disclosed system and method. This description is not an extensive overview of all contemplated aspects, and is not intended to identify key or critical elements of all aspects nor delineate the scope of any or all aspects.

In one aspect, the present disclosure describes a method and system for generating a guest Operating System (OS) crash dump.

Figure 1:
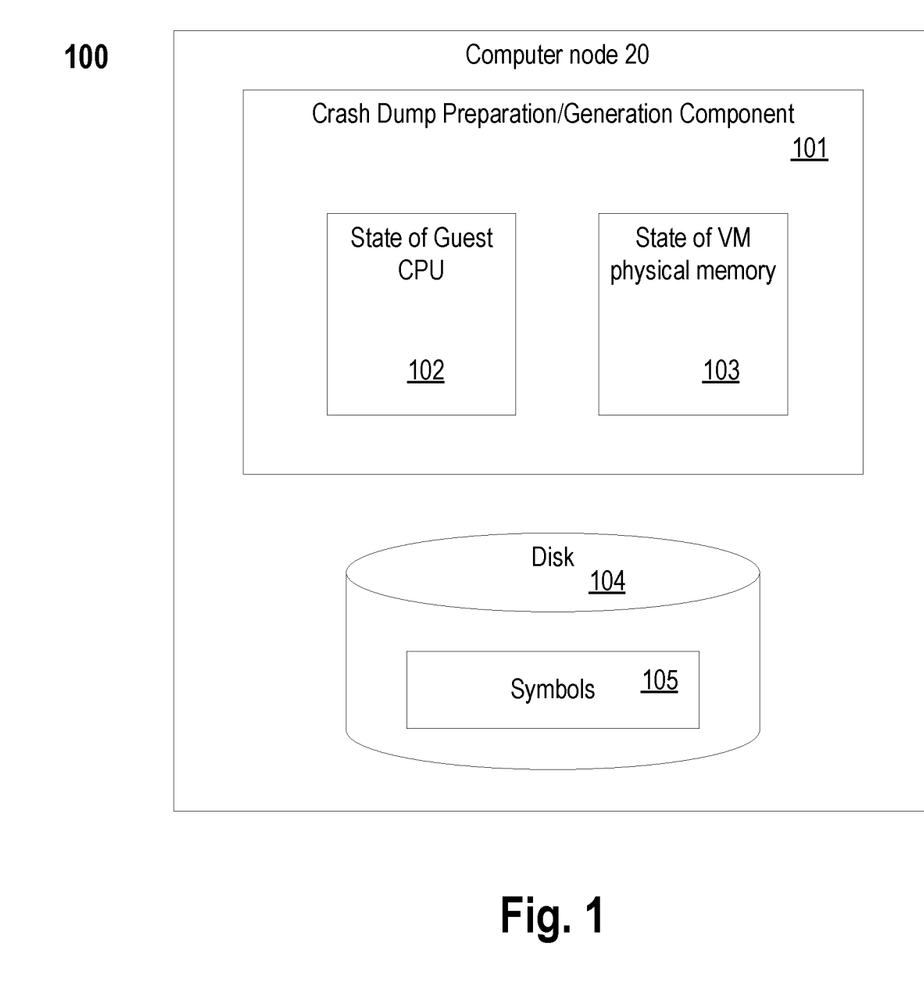
FIG. 1 is a block diagram illustrating main components of a system for generating a guest Operating System (OS) crash dump.

FIG. 1 is a block diagram illustrating main components of a system 100 for generating a guest Operating System (OS) crash dump. The system 100 operates on a computer 20 (see FIG. 8) having a host CPU and a host physical memory. The system 100 includes a crash dump preparation and/or generation component 101 which has access to a state of memory 103 and a state of CPU of a VM 102 (they can be in host memory on disk, available via network, and the like). The crash dump preparation component uses symbols 105 that may be stored on disk 104 in the system 100 or be available via a network, e.g., the Internet.

As described above, there is a need for an optimal tool to analyze problems with guest OSs running in a virtual machine environment. For instance, suppose there is a need to analyze (postmortem) the state of a crashed guest Microsoft Windows operating system. The goal is to generate a crash dump using information available to the hypervisor. The crash dump may be created in such format (e.g., WinDBG dump) that can be analyzed by a standard debugger (e.g., WinDBG in case of Microsoft Windows). In other words, the crash dump may be generated including a state of the guest memory and needed headers in a format suitable for analyzing the crash dump by a standard debugging tool.

Figure 2:
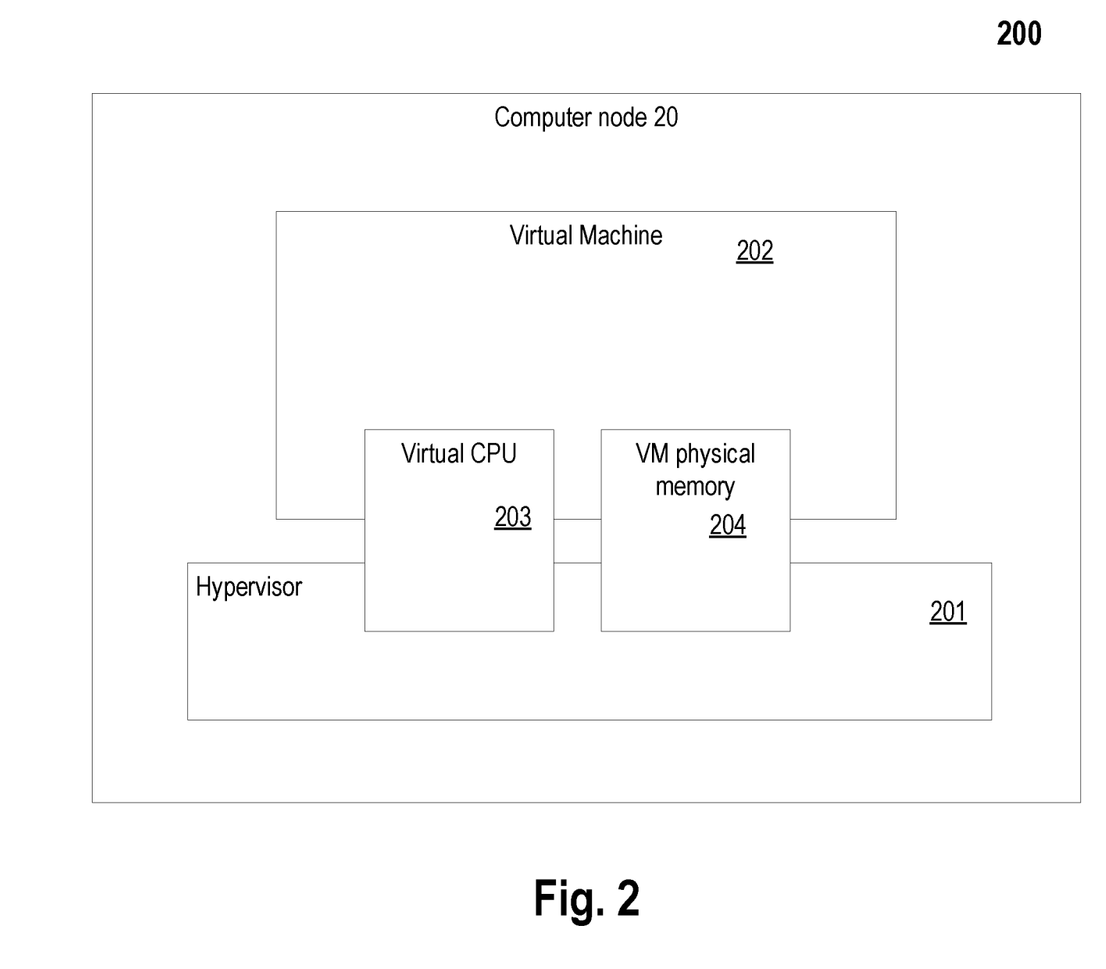
FIG. 2 is a block diagram illustrating an exemplary approach for collecting states of memory and CPU of a virtual machine.

FIG. 2 is a block diagram 200 illustrating an exemplary approach for collecting states of memory and CPU of a virtual machine. The hypervisor 201 operates on a computer 20 having host CPU and host physical memory. The hypervisor 201 has access to the host CPU and host memory. The hypervisor 201 provides a VM 202 with a memory 204 and a virtual CPU 203. The hypervisor 201 also has access to the guest CPU and guest memory.

The hypervisor 201 can have the crash dump preparation/generation component 101 as one of its components, or it can provide, to the crash dump preparation/generation component 101, access to the states of the guest CPU and guest memory.

In one aspect, a hypervisor 201 may be used to collect information for preparing and generating of the crash dump. For example, the hypervisor may collect and store the state of the memory for the purpose of generating the crash dump. However, in order to use the state of the memory as a crash dump, it is necessary to add a correct header to the state. The header is used for containing information about needed kernel objects and locations of the needed kernel objects. Using the header, the debugger is able to understand which functions, structures and variables (in other words, symbols) are needed and where they are located. Therefore, the method of the present disclosure may identify addresses of kernel objects using information available to the hypervisor: guest physical memory and the state of the guest CPU.

When a guest OS is running in a VM under a hypervisor, the hypervisor has full access to the VM memory and knows the guest CPU state. Thus, by having information available to the hypervisor, it is possible to use not only the memory state but also the state of processor registers. This information is then used for generation of the crash dump.

In one aspect, the collecting of information and the generating of the crash dump are done from the hypervisor. In another aspect, the hypervisor provides the collected information about guest memory (physical or virtual) and the state of the guest CPU to another tool or another host. Then, the crash dump is generated in the other tool or host using the information received from the hypervisor. The resulting crash dump can be used by the debugger, e.g. a conventional debugger.

In one aspect, addresses of some kernel objects may be found using state of the guest CPU. For instance, registers of guest CPU may contain links (addresses) to structures/functions or places in the code—thereby simplifying the process of determining locations of objects needed to generate the header for the crash dump.

In one aspect, the location of certain pieces of code or data structures (e.g., page tables—describing translation of virtual addresses to physical memory) may be extracted from the guest processor registers.

In one aspects, once the version of the OS is known, all the other components can be located.

For clarity, a page table is the data structure used by a virtual memory system in a computer operating system to store the mapping between virtual addresses and physical addresses. Virtual addresses are used by the program executed by the accessing process. The physical addresses are used by the hardware, or more specifically, by the RAM subsystem. The page table is a key component of virtual address translation, which is necessary to access data in memory.

In one aspect, the control register 3 (CR3 register) in the Intel architecture enables the processor to translate linear addresses into physical addresses by locating/pointing to the page directory and page tables for a current task.

In one aspect, the guest CPU registers may be used to identify location of at least one of: page tables, IDT (interrupt descriptor table), system task descriptor(s). When the information can be obtained from the guest CPU, the information is used to identify locations of needed structures much faster and without errors.

In one aspect, the guest CPU registers are further used to derive information about paging. In one aspect, the location (address) of page tables is derived using information stored in guest CPU registers. For example, one of the guest CPU registers (depending on guest CPU architecture) may contain the address of one of the tables used for performing translation from virtual addresses to physical pages.

Figure 3:
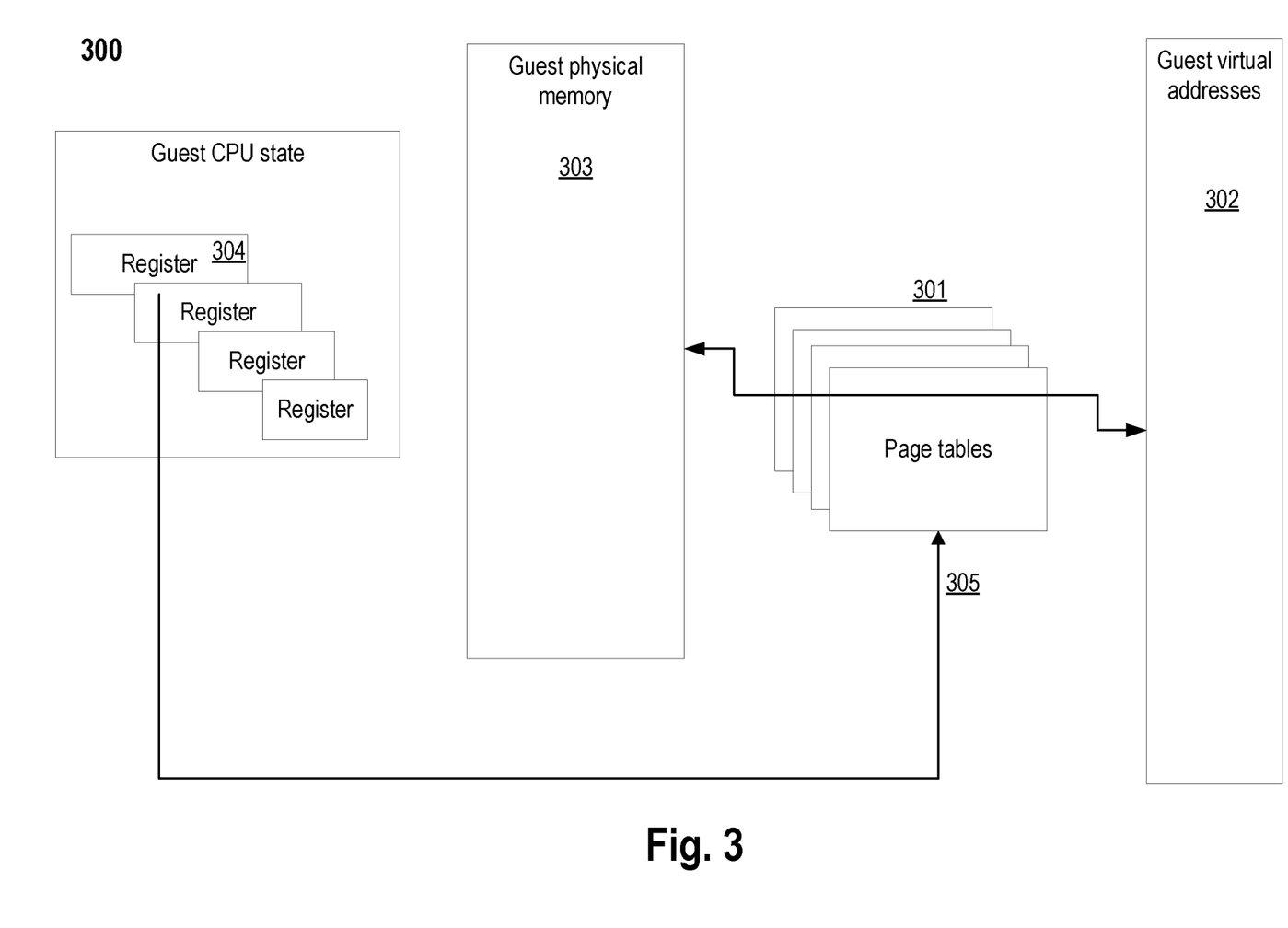
FIG. 3 is a block diagram illustrating an exemplary approach for accessing page tables by a crash dump generator of the present disclosure.

FIG. 3 is a block diagram 300 illustrating an exemplary approach for accessing page tables by a crash dump generator of the present disclosure. The guest OS uses page tables 301 to provide translation between guest virtual addresses 302 and physical pages 303. One of the guest CPU registers 304 has a link 305 to page tables 301.

In one aspect, having information about page tables location and having access to the VM physical memory, the program, which prepares the crash dump (e.g., a crash dump generator, which can be a hypervisor itself, or can be a separate program which has (e.g., obtains from the hypervisor) information about the guest CPU and guest physical memory, etc.) may operate with virtual addresses in a guest memory address space. Thus, in one aspect, at least some further actions are performed using virtual addresses.

In one aspect, the system that prepares the crash dump (e.g., including any software components that prepare the dump) operates with the virtual addresses and performs translation from the virtual addresses to physical pages. In one aspect, the system that prepares the crash dump adds contents of guest physical memory pages to the crash dump and puts (writes) the location (e.g., address) of page tables to the crash dump header such that the debugger can read the crash dump header, perform the translation, and use the virtual addresses.

In order to prepare the crash dump, the system needs to know the kernel version and build information. Therefore, in one aspect, the system finds the kernel image in memory and determines the kernel version and build information from the kernel image.

Figure 4:
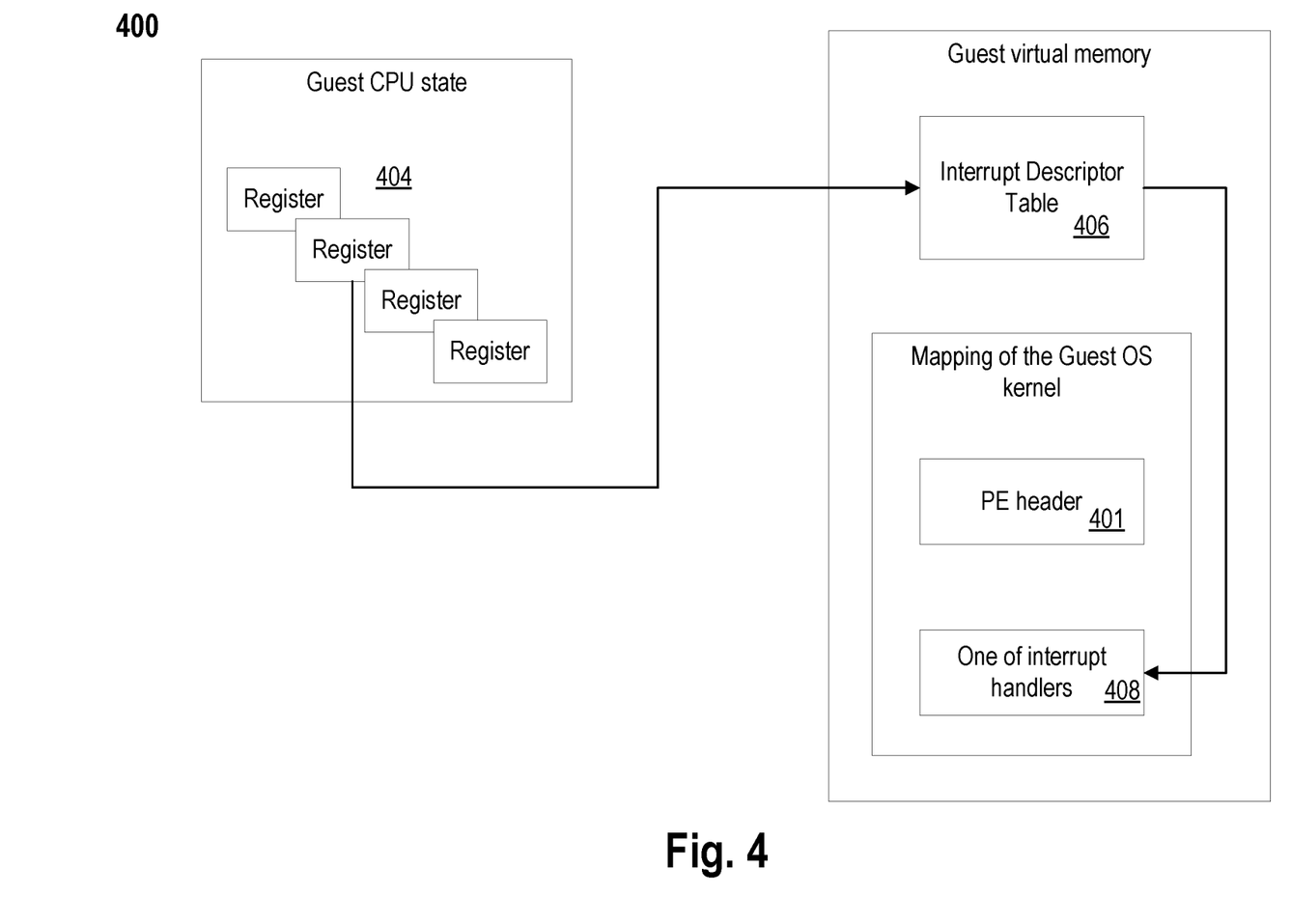
FIG. 4 is a block diagram illustrating an exemplary approach for identification of the OS kernel version and accessing PE header in a mapping of a guest OS kernel image by a crash dump generator of the present disclosure.

FIG. 4 is a block diagram 400 illustrating an exemplary approach for identification of the OS kernel version and accessing PE header in a mapping of a guest OS kernel image by a crash dump generator of the present disclosure.

In one aspect, the location of the data structure used by the guest CPU architecture is identified using guest CPU registers 404. For instance, for the data structure used by the x86 and the AMD64 architecture to implement an interrupt vector table, a data structure referred to as an Interrupt Descriptor Table (IDT) 406 is used. The IDT 406 is then used, by the processor, to determine the correct response to interrupts and exceptions. Use of the IDT is triggered by three types of events: hardware interrupts, software interrupts, and processor exceptions, which together are referred to as "interrupts". The IDT is used to store links to functions (e.g., interrupt handlers) that are located inside of the executable image of the OS kernel (e.g., ntoskrnl.exe, etc.). Other architectures have similar data structures.

So, the location of the interrupt descriptor table (IDT) 406 or any other similar data structure appropriate for the guest CPU architecture may be identified using the guest CPU registers 404. In one aspect, for example, a link (or an address) of the IDT is stored in one of the processor registers 404.

After the location of the IDT (or similar data structure) is found, an address to one of functions in the IDT 408 can be found. For example, in some aspects, the IDT contains a page fault exception handler (e.g., "mmpagefault" in Microsoft Windows). The code of the relevant function is located somewhere in the executable image of OS kernel.

In one aspect, once the address to a particular function of the IDT is found, the system scans the memory for the beginning of the executable kernel module of the OS (i.e., looking for a specific header) starting from the address of the particular function from the IDT (or starting with another pointer located in the IDT). The system scans the memory in the direction of decreasing addresses.

In one aspect, the scanning of the memory is performed in virtual addresses. For instance, the scanning may be performed in virtual addresses when the system already has information about page tables. In other aspect, scanning may by in physical addresses, e.g., if the pages of executable image are successively loaded into memory.

For example, the system (e.g., module/component/application that prepares and generates crash dump) looks for a portable executable (PE) file header 401 (or a similar header depending on the type of guest OS) by scanning the virtual addresses starting with the address of a function in 408. When the PE file header 401 is found, the system determines whether or not it is the header of the kernel executable image, e.g., by checking a name of the image stored in the PE file header.

It is noted that this approach is a much faster and much more reliable way to find the beginning of the PE file mapping. The alternative which involves scanning the whole memory of a real VM is an extremely long operation. Thus, in this aspect, the system of the present disclosure has a safe place from which it can start scanning and the system has approximate knowledge of how far the scanning should proceed. Consequently, the scanning of the present disclosure is fast. Moreover, during the scanning, the system is not looking for four letters in a row (as it was in prior art solutions), but rather it is looking for a standard PE file header. Scanning for the standard PE file header is reliable because it can be verified with a high degree of accuracy. Furthermore, since the PE header format is documented and known by those skilled in the relevant art, the PE header format may be used for determination of other attributes and for determination of structures needed for preparing the header of the crash dump.

In one aspect, the system obtains the exact kernel version from the PE header 401. For example, the build ID (identifier) or the checksum of the kernel executable file lies in one of the fields in the PE header 401. Once the version is known, the system may then download the appropriate debugging symbols. For example, the appropriate debugging symbol may be downloaded using the checksum to create a URL for downloading the debugging symbols. In one aspect, either some debugging symbols or the full debug description of the kernel may be downloaded.

When the debugging symbols are downloaded, the system can parse the downloaded debugging symbols to determine locations in the VM memory of the structures needed for the crash dump preparation (e.g., to obtain information needed for crash dump header preparation). Then, in one aspect, the system, using the debugging symbols, gets (restore) offsets to the structures (and their fields), functions, variables (and kernel objects) that are needed for preparing the crash dump header in a format suitable for the debugger. In other words, the system determines the offsets (in virtual address) to structures needed for generation of the header of the crash dump.

Figure 5:
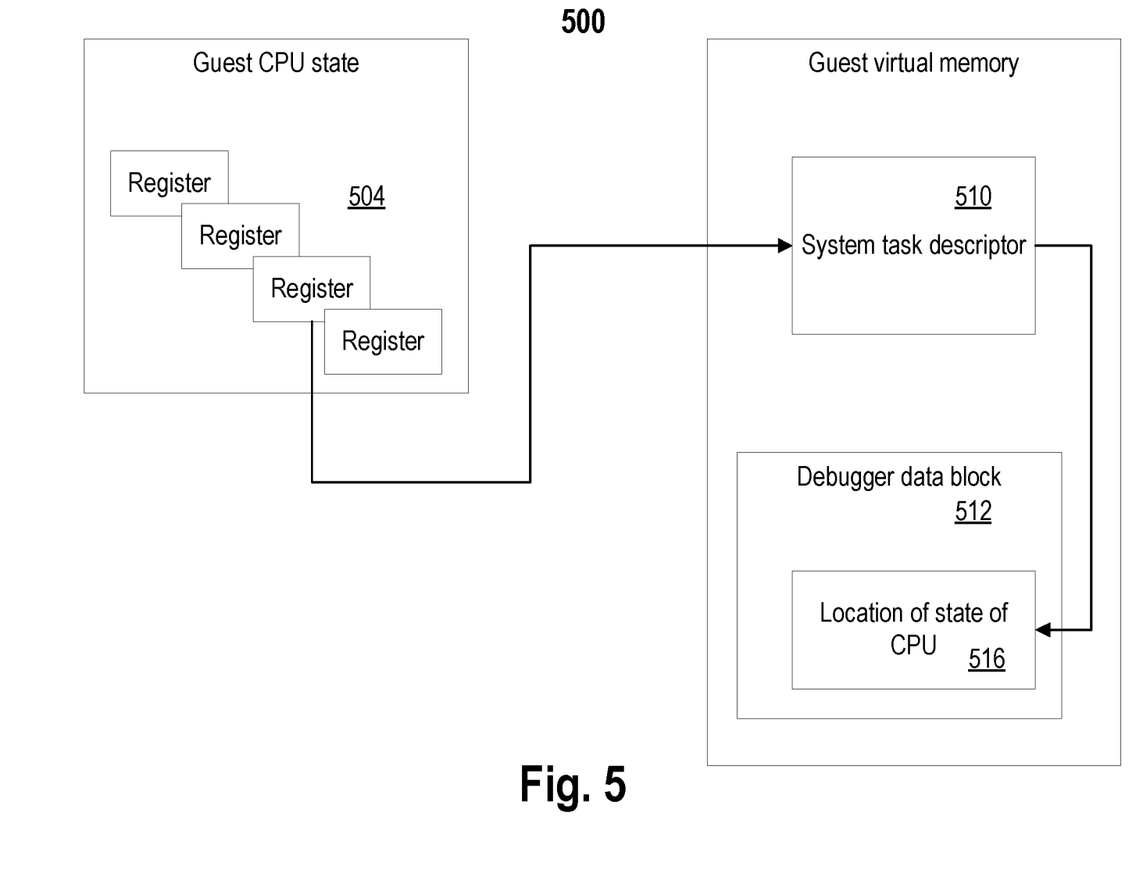
FIG. 5 is a block diagram illustrating an exemplary approach for identification of system tasks and finding structures needed for preparation of the dump header by a crash dump generator of the present disclosure.

FIG. 5 is a block diagram 500 illustrating an exemplary approach for identification of system tasks and finding structures needed for preparation of the crash dump header by a crash dump generator of the present disclosure.

In one aspect, the guest CPU registers 504 are used to find a current system task that is being executed on the processor. For example, one of the registers may contain a link to a structure describing the current task being executed. If the current task is not a system task, then the system task may be determined using the current task being that is being executed on the processor.

In one aspect, the description of the system task (e.g., a structure called "system task descriptor") 510 contains information about the executable kernel image and a state of the execution. In another aspect, the description of the system task also contains information about and/or links to kernel objects needed for crash dump preparation . For example, the description may contain the paging directory.

Recalling that, in a conventional OS, the system creates special exception records in memory (for the case of crash) and the debuggers look for these exception records in crash dump. In order to generate the crash dump, the system of the present disclosure also identifies (finds or even creates in different aspects) exception records and fills the identified exception records with the corresponding information at a location 516. For example, the exception records (or equivalent) may be filled to contain at least the state of the CPU at the moment when a critical error happened.

In one aspect, the location 516 is determined using the system task descriptor 510. In one aspect, the system task descriptor 510 contains a link to a special debug block 512 (e.g., a debugger data block in memory) which contains exception records. The link to the special debug block 512 is on the system task, even when the system is operating normally, i.e., without errors.

In one aspect, the system task descriptor 510 includes a link to a structure instead of a direct link to a location of the state of the CPU 516. The link to the structure may contain another link to another structure, and so on. At least one of the structures may have a link to the actual location.

In one aspect, the system also changes the VM memory, for example, puts in the VM memory the state of CPU (e.g., into exception records) as it was at the moment of the crash. In one aspect, the changing of the VM memory to store the state of the CPU at the moment of the crash is performed by a hypervisor before collecting the state of memory. In another aspect, the changing of the VM memory state is performed by changing the memory dump after collection of the memory state, e.g., by writing this information to a specified location in the dump, etc. For example, some information that used to be in the guest's memory may be needed to fill the dump header, some information to change the memory may be needed(e.g., information for patching directly in the VM memory before collecting VM memory state, or for writing into the memory section of the crash dump). Thus, the collected information is used either for preparing the correct header of the crash dump or for changing the memory in order to put the state of the CPU into the memory state of crash dump.

In one aspect, the system may collect information about the state of the CPU or the information about the structures needed to generate the header of the crash dump at any time. The procedure is valid as soon as the guest OS starts (or as soon as kernel image is loaded into memory).

In one aspect, the system may collect information about structures after the OS boot or during the OS boot. This will guarantee that the structures in the header of the crash dump will be correct, even if the state of the guest CPU is corrupted during the OS crash. Because at least some fields will not be changed during Guest OS execution. Other fields may be changed after error occurs.

Figure 6:
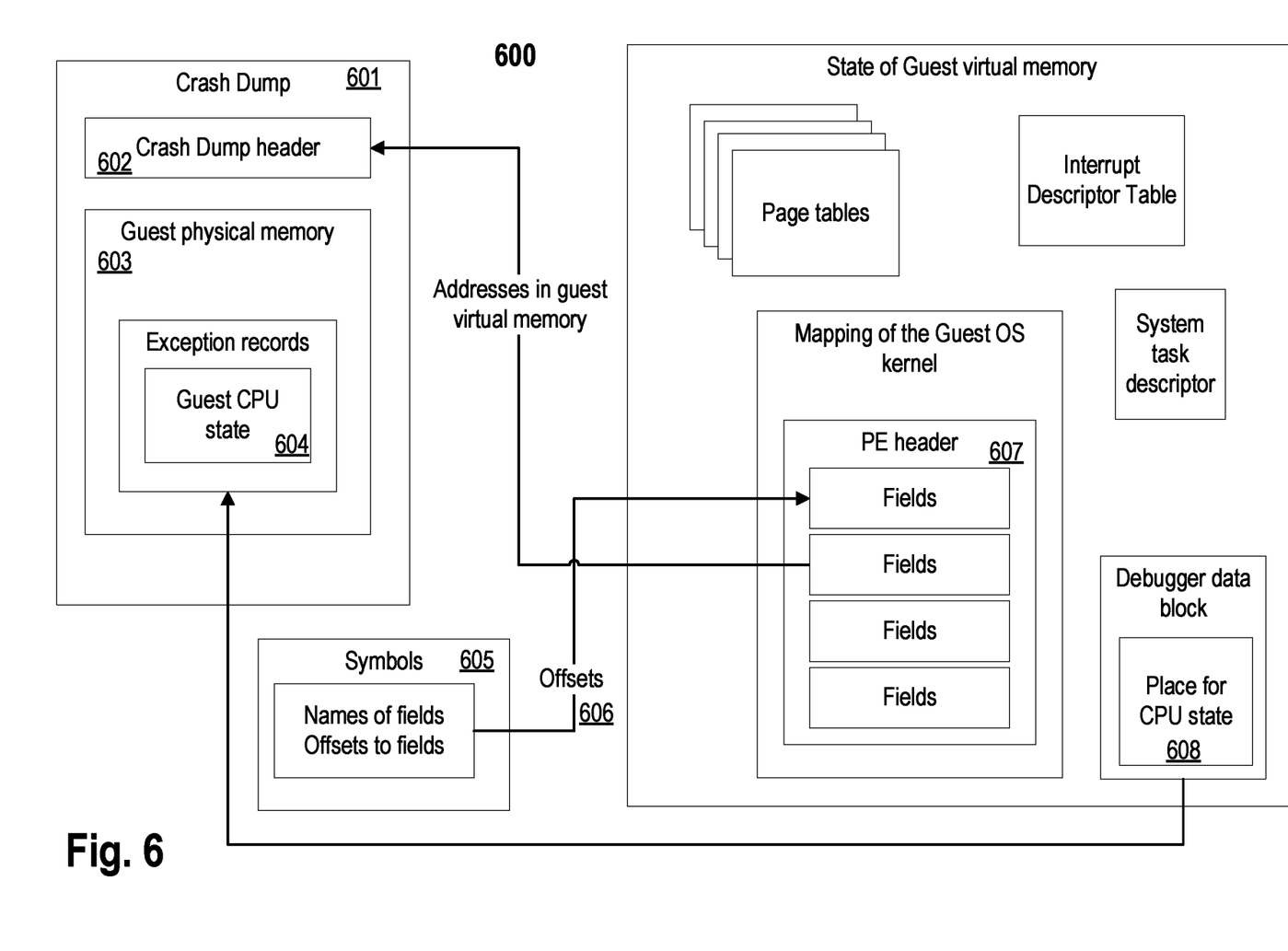
FIG. 6 is a block diagram illustrating an exemplary approach for finding structures needed for preparation of dump header and generating a crash dump by a crash dump generator of the present disclosure.

FIG. 6 is a block diagram 600 illustrating an exemplary approach for finding structures containing information needed for preparation of a crash dump header and generating a crash dump by a crash dump generator of the present disclosure. The crash dump 601 has a crash dump header 602 (that contains information for the debugger) and the state of the guest physical memory 603, which in turn contains the state of the CPU 604. The crash dump generator parses symbols 605, gets offsets 606 (e.g., using information about symbols), and finds the structures using information about the structures located in the header 607, and finds the location in the guest memory where the state of the CPU is written 608.

In one aspect, the system of the present disclosure operates on a hardware computer and contains a module/component that prepares and/or generates the crash dump. The system has information about states of the VM memory and states of the VM CPU. The information about the states of the VM memory and the states of the VM CPU may be obtained in various ways. In one aspect, when the system includes a hypervisor, the hypervisor already has access to the VM CPU and memory. Therefore, the hypervisor itself may prepare the crash dump and header of the crash dump. Alternatively, the hypervisor may provide the information to another component which will prepare the header of the crash dump. When the system operates on a different computer from the one where the hypervisor with VM runs (e.g., the system contains dump preparation module, but does not contain the hypervisor, and obtains memory and CPU states via network), the system may receive the states of the memory and CPU in a file, for example.

The component that prepares the crash dump using the obtained information (e.g., information containing at least a snapshot of the memory and the state of the processor) generates a crash dump file in a format suitable for being analyzed by a debugger (e.g., any conventional debugger, e.g., WinDBG in Microsoft Windows).

In one aspect, when the host operates under a LINUX operating system, the hypervisor can have a built-in feature for generation of crash dumps for guest operating system. The crash dump generated by the hypervisor is in an ELF format (executable and linkable format) when the host operating system is LINUX. The crash dump also contains guest physical memory and guest CPU state. But, in the case of Microsoft Windows being the OS guest, the crash dump does not have a header needed for a conventional Microsoft Windows debugger. Therefore, in such a case, the component that prepares the crash dump takes the ELF file from the hypervisor and reformats it into the crash dump format of Microsoft Windows. The reformatting includes: creating a corresponding header suitable for Microsoft Windows environment. In this case, the crash dump generated in the ELF format may be sent (e.g., by the user) from a computer with the hypervisor to a computer where the crash dump preparation component runs.

In one aspect, the crash dump preparation software component may be a part of a hypervisor.

In one aspect, the system also obtains corresponding symbols. In some aspects, the symbols are obtained by connecting to an official OS symbol server via the Internet. Alternatively, the symbols are obtained in any other way, e.g., by storing the symbols corresponding to client VMs on the system disk/storage.

Therefore, collecting information about the state of the memory state and the state of the CPU, in different aspects, may be performed either by directly accessing the VM CPU and memory or by first saving the states in a file and then transferring the content of the file to a crash dump generator.

Figure 7:
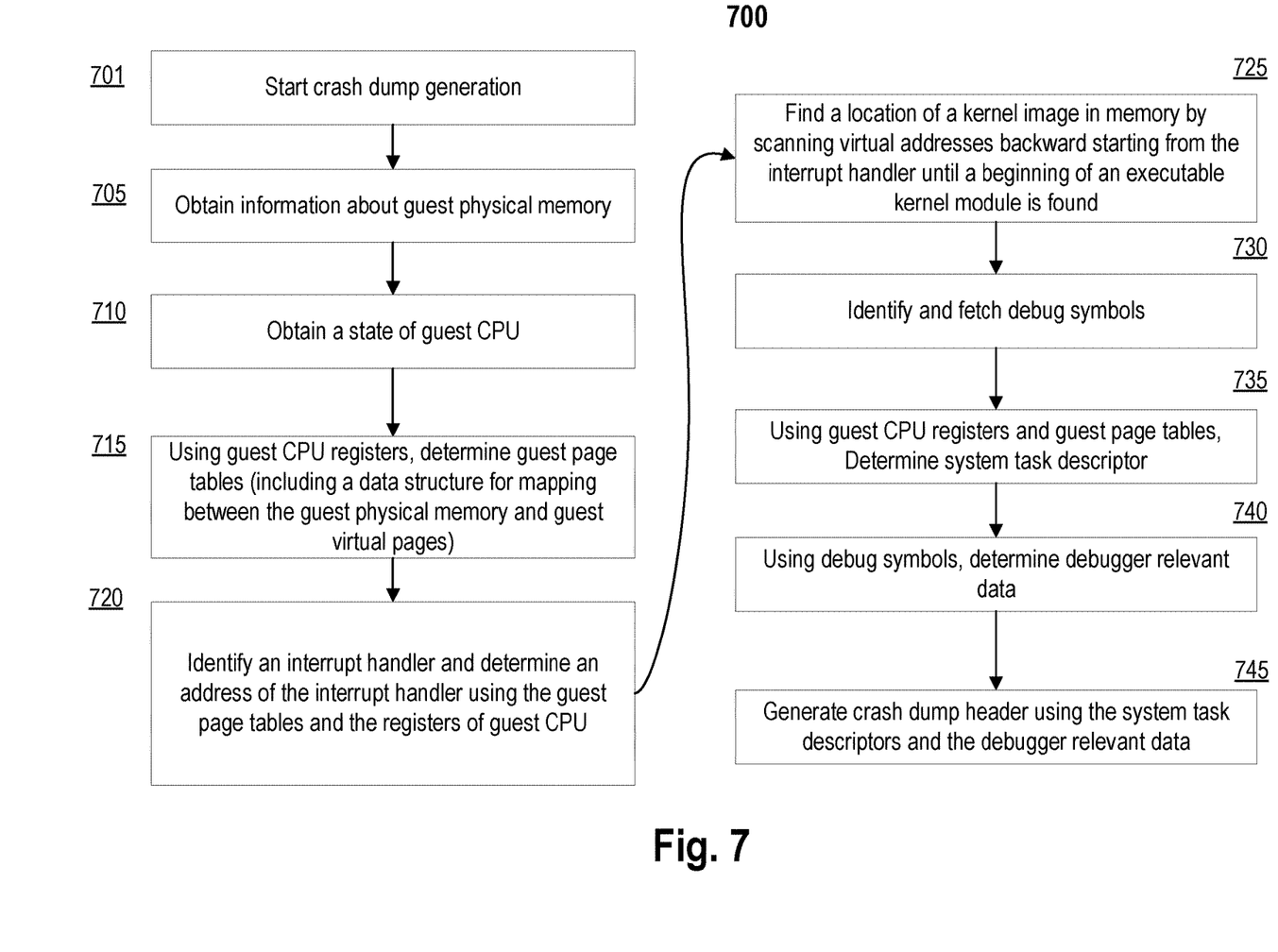
FIG. 7 is a flow diagram of the method for generating a guest Operating System (OS) crash dump in accordance with the teachings of the disclosure.

FIG. 7 is a flow diagram of the method 700 for generating a guest Operating System (OS) crash dump in accordance with the teachings of the disclosure. The method 700 starts the generating of the crash dump in step 701 and proceeds to step 705.

In step 705, method 700 obtains information about a guest physical memory.

In step 710, method 700 obtains a state of the guest CPU.

In step 715, method 700 determines guest page tables including a data structure for mapping between the guest physical memory and guest virtual pages using registers of the guest CPU.

In step 720, method 700 identifying an interrupt handler and determining an address of the interrupt handler using the guest page tables and the registers of guest CPU.

In step 725, method 700 finds a location of a kernel image in memory by scanning virtual addresses backward starting from the interrupt handler until a beginning of an executable kernel module is found.

In step 730, method 700 identifies and fetches debug symbols.

In step 735, method 700 determines system task descriptor using the debug symbols.

In step 740, method 700 determines debugger relevant data, in one aspect, using the CPU registers.

In step 745, method 700 generates the crash dump header using the system task descriptor and the debugger relevant data.

In one aspect, the fetching of the debug symbols is performed by: determining a kernel version from a Portable Executable (PE) file header of the executable kernel module, and downloading the debug symbol for the kernel version.

In one aspect, the determination of the debugger relevant data using the debug symbols comprises: parsing the debug symbols to determine offsets to data structures and respective fields, functions, variables or kernel objects to be used for preparing the crash dump in a format suitable for a debugger. And using the registers of the guest CPU to identify a current system task being executed on the guest CPU, a state of execution, and links to kernel objects needed for crash dump preparation.

In one aspect, the obtaining of information about the guest physical memory and the state of the guest CPU and generation of the crash dump is performed using a hypervisor.

In one aspect, the obtaining of information about the guest physical memory and the state of the guest CPU is performed by a hypervisor, and the generation of the crash dump is performed by a host or by a tool running on another device.

In one aspect, the determination of the guest page tables comprises extracting, from registers of the guest CPU, addresses or links to addresses of kernel objects.

In one aspect, the interrupt handler is identified using an Interrupt Descriptor Table (IDT), and wherein the address of IDT is extracted from the registers of the guest CPU.

In one aspect, the determination of the beginning of the executable kernel module of the OS comprises: searching until a Portable Executable (PE) file header is found, verifying a name of the image to determine whether the PE file header that is found is that of the executable kernel module, and continuing the search for a next PE file header, when the verification indicates that the PE file header that is found is not that of the executable kernel module.

Figure 8:
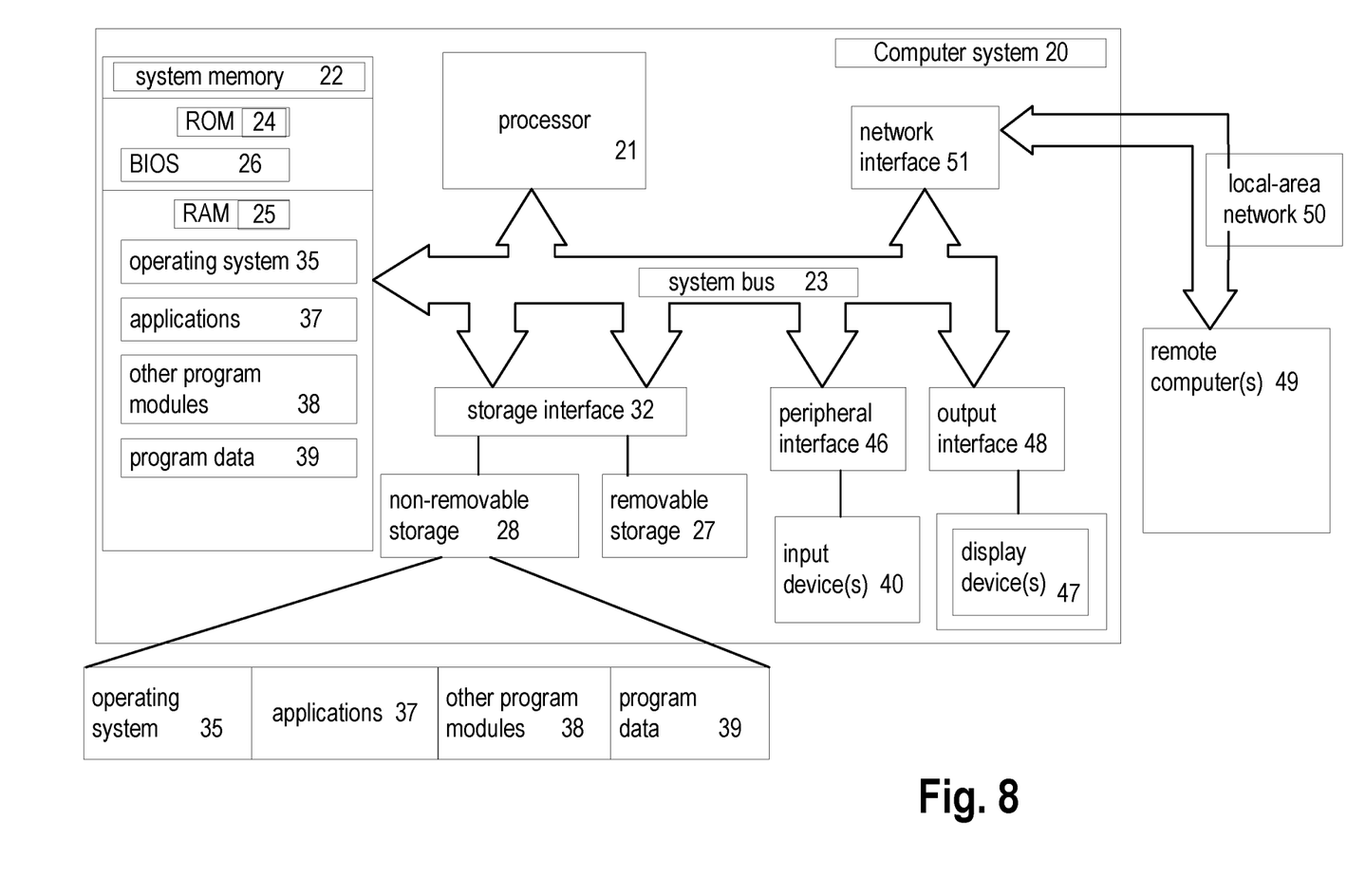
FIG. 8 is a block diagram illustrating a general-purpose computer system on which aspects of the present disclosure may be implemented in accordance with an exemplary aspect.

FIG. 8 is a block diagram illustrating a computer system 20 on which aspects of systems and methods for generating a guest Operating System (OS) crash dump in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs);and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 8, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A method for generating a guest Operating System (OS) crash dump, the method comprising:
    obtaining, by a computing device, information about a guest physical memory and a state of a guest Central Processing Unit (CPU) of the crashed guest OS;
    determining, by the computing device, guest page tables in the guest physical memory of the crashed guest OS, including a data structure for mapping between the guest physical memory and guest virtual pages, using registers of the guest CPU from the state of the guest CPU of the crashed guest OS;
    identifying, by the computing device, an interrupt handler and determining an address of the interrupt handler in the guest physical memory of the crashed guest OS using the guest page tables and the registers of guest CPU;
    finding, by the computing device, a location of a kernel image in the guest physical memory of the crashed guest OS by scanning virtual addresses backward starting from the interrupt handler until a beginning of an executable kernel module of the crashed guest OS is found;
    identifying, by the computing device, and fetching, by the computing device, debug symbols for the crashed guest OS kernel;
    determining, by the computing device, system task descriptors of the crashed guest OS kernel using the debug symbols;
    determining, by the computing device, debugger relevant data for the crashed guest OS kernel using the debug symbols; and
    generating, by the computing device, a header of the crash dump using the system task descriptors and the debugger relevant data.

2. The method of claim 1, wherein the fetching of the debug symbols is performed by:
    determining a kernel version from a Portable Executable (PE) file header of the executable kernel module; and
    downloading the debug symbol for the kernel version.

3. The method of claim 1, wherein the determination of the system task descriptors using the debug symbols comprises:
    parsing the debug symbols to determine offsets to data structures and respective fields, functions, variables and kernel objects to be used for preparing the crash dump in a format suitable for a debugger; and
    using the registers of the guest CPU to identify a current system task being executed on the guest CPU, a state of execution, and links to kernel objects needed for crash dump preparation.

4. The method of claim 1, wherein the obtaining of information about the guest physical memory and the state of the guest CPU and generation of the crash dump is performed by a hypervisor.

5. The method of claim 1, wherein the obtaining of information about the guest physical memory and the state of the guest CPU is performed by a hypervisor, and the generation of the crash dump is performed by a host or by a tool running on another device.

6. The method of claim 1, wherein the determination of the guest page tables comprises extracting, from registers of the guest CPU, addresses or links to addresses of kernel objects.

7. The method of claim 1, wherein the interrupt handler is identified using an Interrupt Descriptor Table (IDT), and wherein the IDT is extracted from the registers of the guest CPU.

8. The method of claim 1, wherein the determination of the beginning of the executable kernel module of the OS comprises:
   searching until a Portable Executable (PE) file header is found, verifying a name of the image to determine whether the PE file header that is found is that of the executable kernel module; and
   continuing the search for a next PE file header, when the verification indicates that the PE file header that is found is not that of the executable kernel module.

9. A system for generating a guest Operating System (OS) crash dump, the system comprising a computing device comprising a hardware processor configured to:
   obtain information about a guest physical memory and a state of a guest Central Processing Unit (CPU) of the crashed guest OS;
   determine guest page tables in the guest physical memory of the crashed guest OS, including a data structure for mapping between the guest physical memory and guest virtual pages, using registers of the guest CPU from the state of the guest CPU of the crashed guest OS;
   identify an interrupt handler and determine an address of the interrupt handler in the guest physical memory of the crashed guest OS using the guest page tables and the registers of guest CPU;
   find a location of a kernel image in the guest physical memory of the crashed guest OS by scanning virtual addresses backward starting from the interrupt handler until a beginning of an executable kernel module of the crashed guest OS is found;
   identify and fetch debug symbols for the crashed guest OS kernel;
   determine system task descriptors of the crashed guest OS kernel using the debug symbols;
   determine debugger relevant data for the crashed guest OS kernel using the debug symbols; and
   generate a header of the crash dump using the system task descriptors and the debugger relevant data.

10. The system of claim 9, the configuration for fetching of the debug symbols comprising configuration for:
    determining a kernel version from a Portable Executable (PE) file header of the executable kernel module; and
    downloading the debug symbol for the kernel version.

11. The system of claim 9, wherein the configuration for determining the system task descriptors using the debug symbols comprises configurations for:
    parsing the debug symbols to determine offsets to data structures and respective fields, functions, variables and kernel objects to be used for preparing the crash dump in a format suitable for a debugger; and
    using the registers of the guest CPU to identify a current system task being executed on the guest CPU, a state of execution, and links to kernel objects needed for crash dump preparation.

12. The system of claim 9, wherein the obtaining of information about the guest physical memory and the state of the guest CPU and generation of the crash dump is performed by a hypervisor.

13. The system of claim 9, wherein the obtaining of information about the guest physical memory and the state of the guest CPU is performed by a hypervisor, and the generation of the crash dump is performed by a host or by a tool running on another device.

14. The system of claim 9, wherein the determination of the guest page tables comprises extracting, from registers of the guest CPU, addresses or links to addresses of kernel objects.

15. The system of claim 9, wherein the interrupt handler is identified using an Interrupt Descriptor Table (IDT), and wherein the IDT is extracted from the registers of the guest CPU.

16. The system of claim 9, wherein the configuration for determining the beginning of the executable kernel module of the OS comprises configurations for:
    searching until a Portable Executable (PE) file header is found, verifying a name of the image to determine whether the PE file header that is found is that of the executable kernel module; and
    continuing the search for a next PE file header, when the verification indicates that the PE file header that is found is not that of the executable kernel module.

17. A non-transitory computer readable medium storing thereon computer executable instructions for generating a guest Operating System (OS) crash dump, including instructions for:
    obtaining information about a guest physical memory and a state of a guest Central Processing Unit (CPU) of the crashed guest OS;
    determining guest page tables in the guest physical memory of the crashed guest OS, including a data structure for mapping between the guest physical memory and guest virtual pages, using registers of the guest CPU from the state of the guest CPU of the crashed guest OS;
    identifying an interrupt handler and determining an address of the interrupt handler in the guest physical memory of the crashed guest OS using the guest page tables and the registers of guest CPU;
    finding a location of a kernel image in the guest physical memory of the crashed guest OS by scanning virtual addresses backward starting from the interrupt handler until a beginning of an executable kernel module of the crashed guest OS is found;
    identifying and fetching debug symbols for the crashed guest OS kernel;
    determining system task descriptors of the crashed guest OS kernel using the debug symbols;
    determining debugger relevant data for the crashed guest OS kernel using the debug symbols; and
    generating a header of the crash dump using the system task descriptors and the debugger relevant data.

18. The non-transitory computer readable medium of claim 17, the instructions for fetching of the debug symbols comprising instructions for:
    determining a kernel version from a Portable Executable (PE) file header of the executable kernel module; and
    downloading the debug symbol for the kernel version.

19. The non-transitory computer readable medium of claim 17, the instructions for determining the system task descriptors using the debug symbols comprises instructions for:
    parsing the debug symbols to determine offsets to data structures and respective fields, functions, variables and kernel objects to be used for preparing the crash dump in a format suitable for a debugger; and using the registers of the guest CPU to identify a current system task being executed on the guest CPU, a state of execution, and links to kernel objects needed for crash dump preparation.

20. The non-transitory computer readable medium of claim 17, wherein the obtaining of information about the guest physical memory and the state of the guest CPU is performed by a hypervisor, and the generation of the crash dump is performed by a host or by a tool running on another device.

* * * * *